(12) United States Patent
Eilersen

(10) Patent No.: US 7,856,752 B1
(45) Date of Patent: Dec. 28, 2010

(54) PEST TRAP AND MONITORING DEVICE

(76) Inventor: Charles Eilersen, 21490 Sazerac Rd., Virginia City, NV (US) 89521

(*) Notice: Subject to any disclaimer, the term of this patent is extended or adjusted under 35 U.S.C. 154(b) by 530 days.

(21) Appl. No.: 11/638,991

(22) Filed: Dec. 13, 2006

Related U.S. Application Data

(60) Provisional application No. 60/819,410, filed on Jul. 7, 2006.

(51) Int. Cl.
*A01M 1/14* (2006.01)
(52) U.S. Cl. .......................................... 43/114; 43/115
(58) Field of Classification Search .................. 43/114, 43/115, 116, 121; 220/23.9, 23.91, 23.87, 220/23.86, 558, 559, 23.4, 669
See application file for complete search history.

(56) References Cited

U.S. PATENT DOCUMENTS

| 514,388 | A | | 2/1894 | Smith | |
|---|---|---|---|---|---|
| 790,876 | A | * | 5/1905 | Andrus | 43/121 |
| 1,352,924 | A | * | 9/1920 | Streich | 312/334.22 |
| 2,962,836 | A | * | 12/1960 | Hughes | 43/58 |
| 3,023,539 | A | * | 3/1962 | Emerson, Jr. | 43/113 |
| 3,913,259 | A | * | 10/1975 | Nishimura et al. | 43/114 |
| 4,161,079 | A | * | 7/1979 | Hill | 43/58 |
| 4,208,828 | A | * | 6/1980 | Hall et al. | 43/114 |
| 4,349,981 | A | * | 9/1982 | Sherman | 43/131 |
| 4,538,784 | A | * | 9/1985 | O'Flanagan | 248/244 |
| 4,709,503 | A | * | 12/1987 | McQueen | 43/114 |
| 4,815,231 | A | | 3/1989 | McQueen | |
| 4,914,341 | A | * | 4/1990 | Weaver et al. | 312/407 |
| 5,572,825 | A | | 11/1996 | Gehret | |
| 5,588,250 | A | | 12/1996 | Chilba et al. | |
| 5,713,153 | A | | 2/1998 | Cook et al. | |
| 6,108,965 | A | * | 8/2000 | Burrows et al. | 43/113 |
| 6,442,889 | B1 | | 9/2002 | Lee | |
| 6,609,627 | B1 | * | 8/2003 | Clarke | 220/592.2 |
| 2005/0274058 | A1 | | 12/2005 | Miller | |

\* cited by examiner

*Primary Examiner*—Joshua J Michener
(74) *Attorney, Agent, or Firm*—Klarquist Sparkman, LLP

(57) ABSTRACT

The technology disclosed herein relates to monitoring pest activity as well as for trapping pests. Insects, reptiles, birds and rodents entering commercial or residential structures are most often referred to as occasional invaders in the pest industry. In accordance with the embodiment, a general purpose device is disclosed that is suitable for trapping a wide variety of occasional invaders, including specific target pests. By trapping such occasional invaders, their presence, and in some cases indications of their quantities, can be monitored.

21 Claims, 6 Drawing Sheets

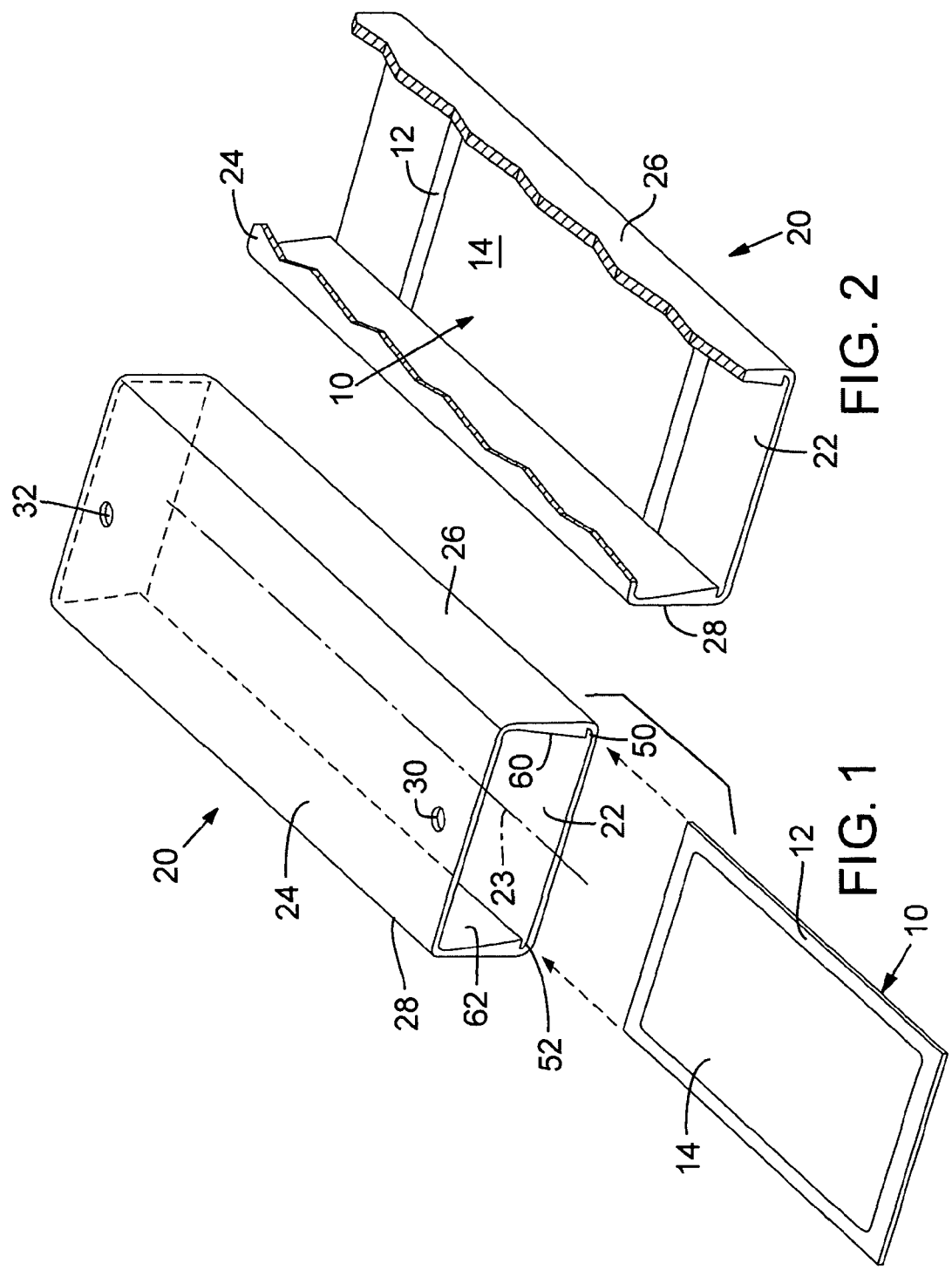

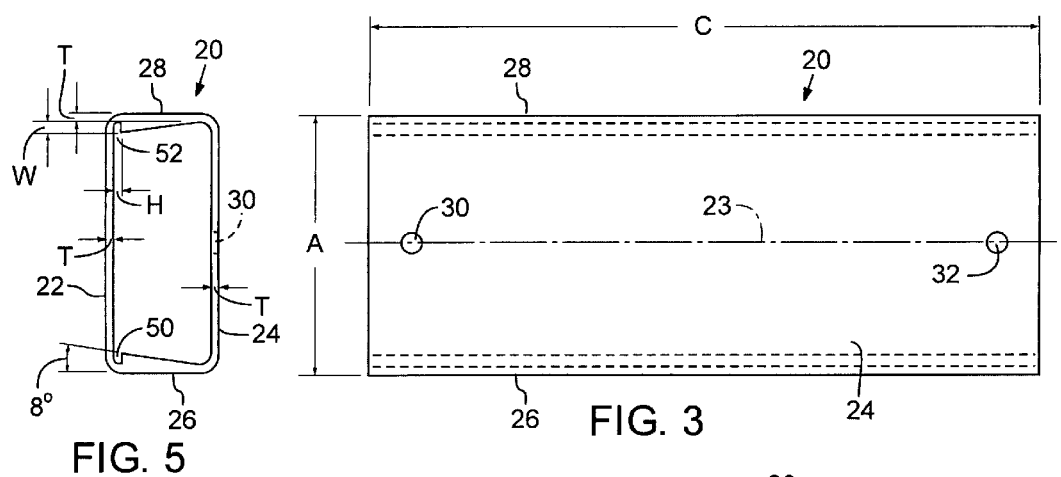
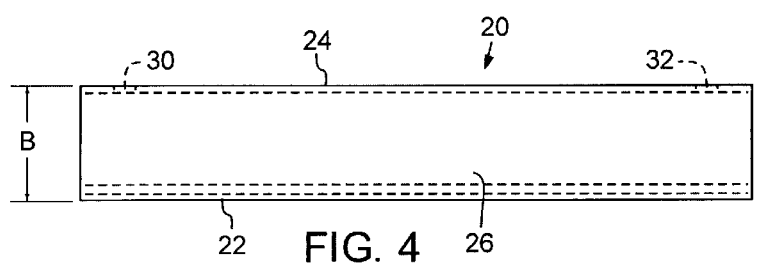

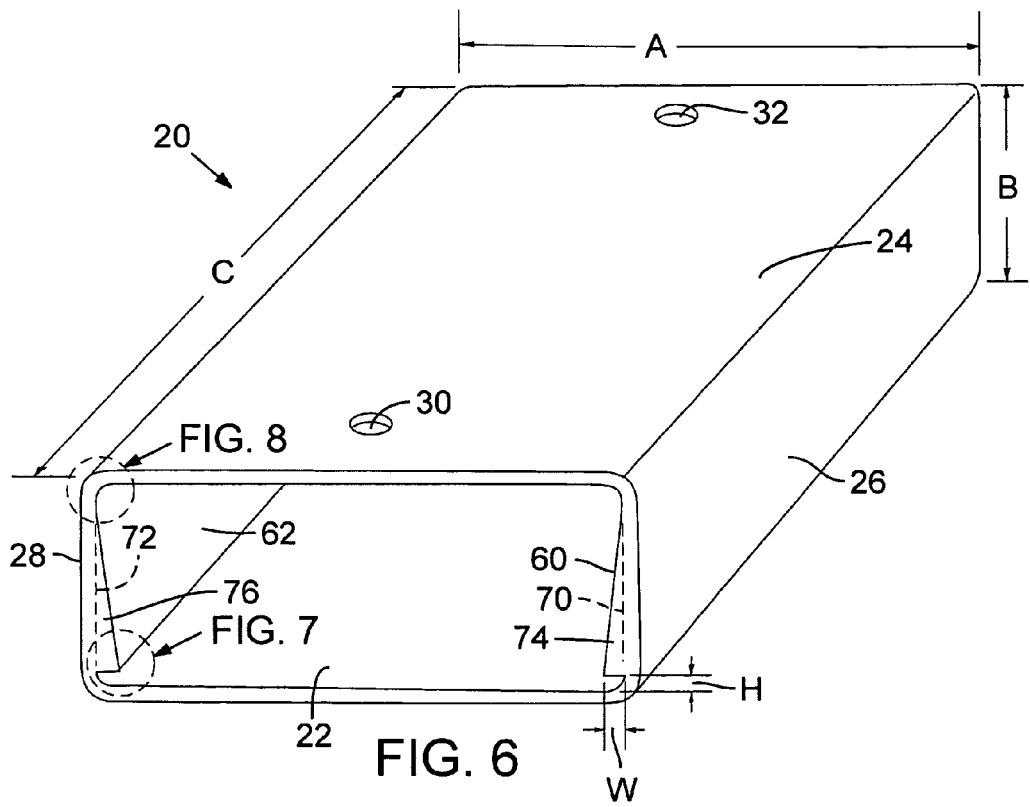
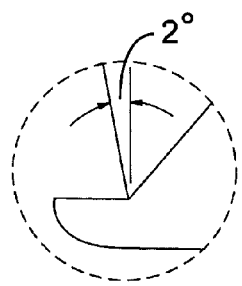 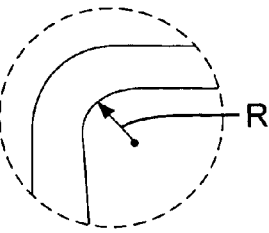
FIG. 7        FIG. 8

PEST TRAP AND MONITORING DEVICE

RELATED APPLICATIONS

This application claims the benefit of U.S. provisional patent application Ser. No. 60/819,410 entitled PEST TRAP AND MONITORING DEVICE, filed Jul. 7, 2006, which is incorporated herein by reference.

SUMMARY

The technology disclosed herein relates to monitoring pest activity as well as for trapping pests, such as varieties of insects, reptiles, birds and rodents. Insects, reptiles, birds and rodents entering commercial or residential structures are most often referred to as occasional invaders in the pest industry. In accordance with the embodiment, a general purpose device is disclosed that is suitable for trapping a wide variety of occasional invaders, including specific target pests. By trapping such occasional invaders, their presence and in some cases indications of their quantities can be monitored.

BRIEF DESCRIPTION OF THE DRAWINGS

FIG. 1 is a perspective view of one embodiment of a pest trapping and monitoring device in accordance with the disclosure and with a pest entrapping glue board ready for insertion into the device.

FIG. 2 is a partially broken away view of the embodiment of FIG. 1, with the glue board inserted into the device.

FIG. 3 is a top view of the embodiment of FIG. 1.

FIG. 4 is a side view of the embodiment of FIG. 1.

FIG. 5 is an end view of the embodiment of FIG. 1 rotated 90 degrees from the position of normal use.

FIG. 6 is a perspective view of an alternative embodiment of a pest entrapment and monitoring device.

FIG. 7 is an enlarged view of a portion of the device of FIG. 6.

FIG. 8 is an enlarged view of another portion of the device of FIG. 6.

DETAILED DESCRIPTION

Figure 10:
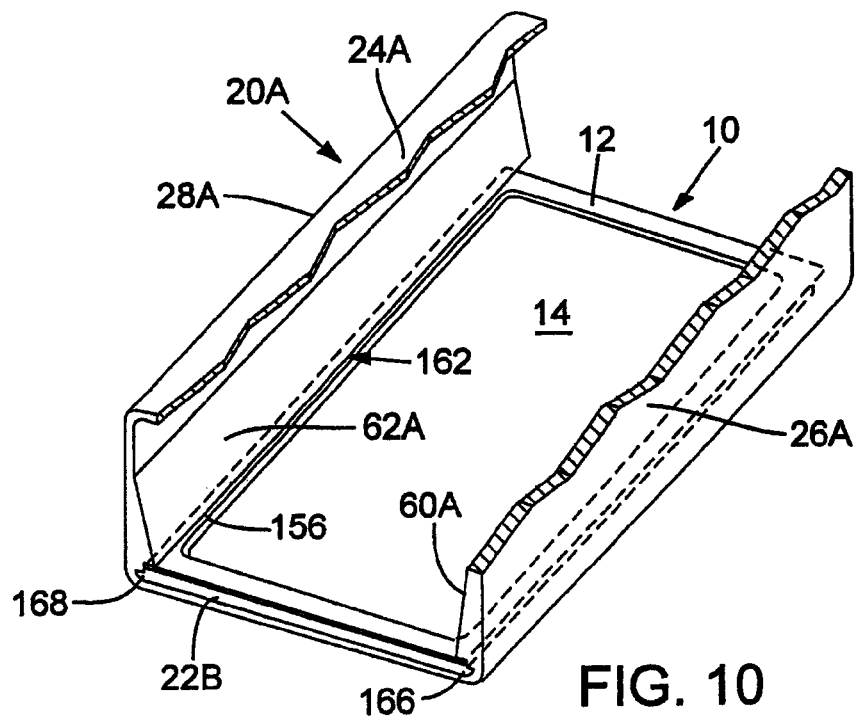
FIG. 10 is a partially broken away view of this embodiment of FIG. 9, with a glue tray inserted into the device.
Figure 11:
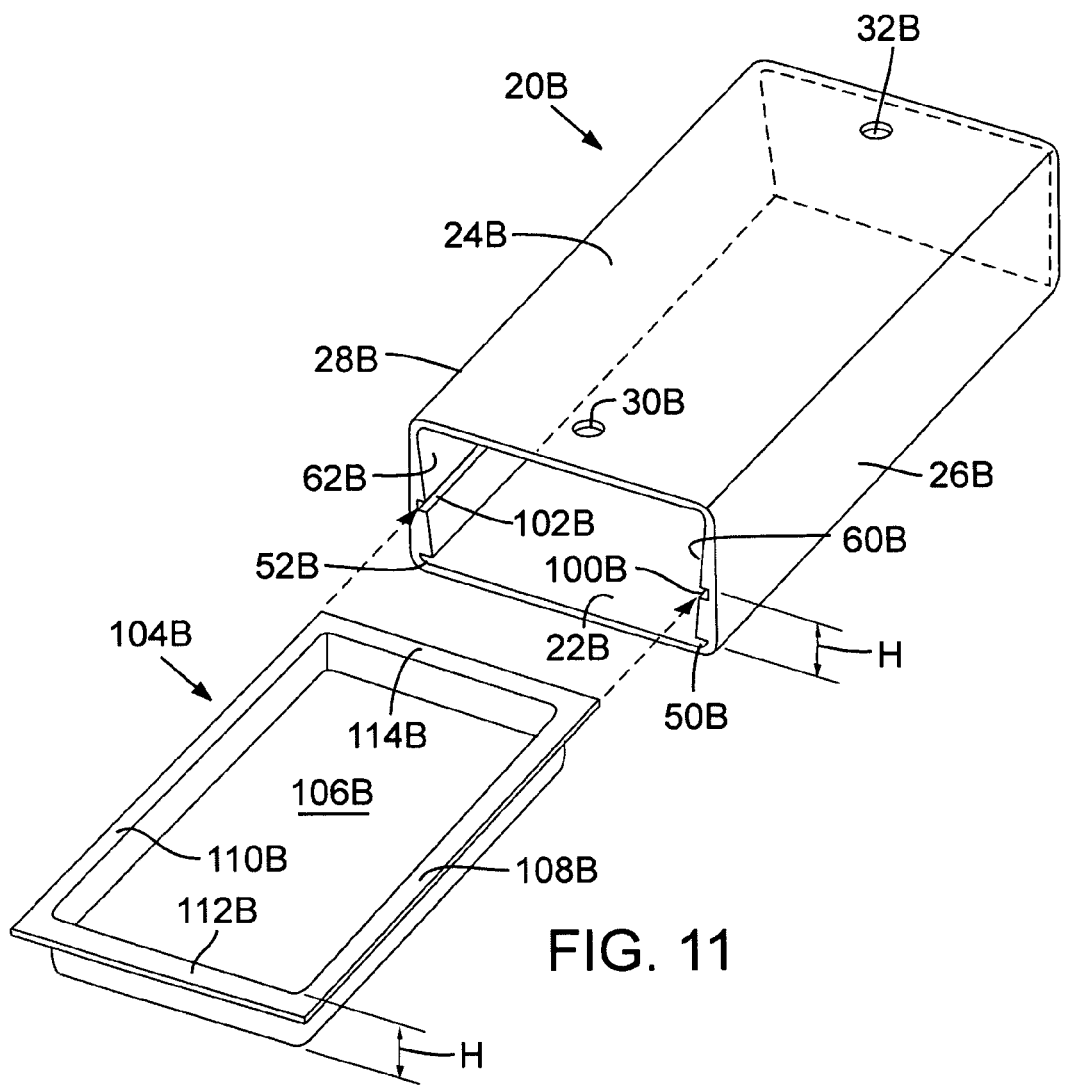
FIG. 11 is a perspective view of yet another embodiment of a pest trapping and monitoring device in accordance with the disclosure and with a pest entrapping glue tray ready for insertion into the device.
Figure 12:
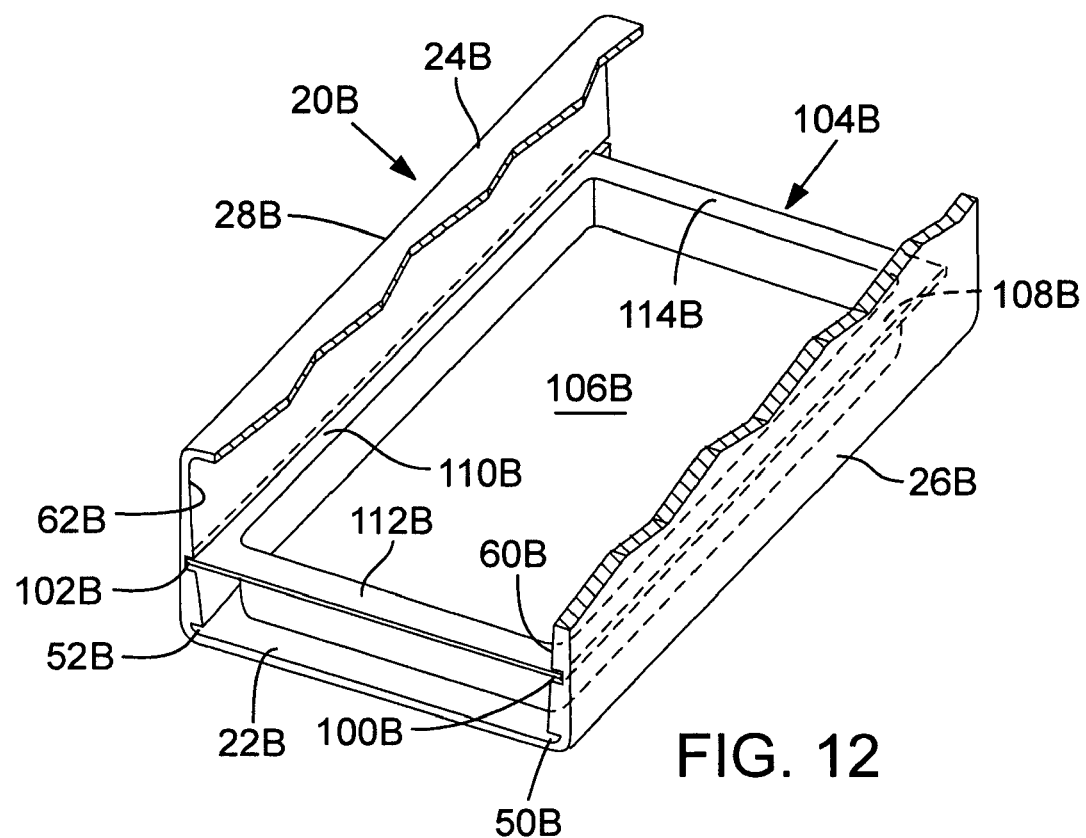
FIG. 12 is a partially broken away view of the embodiment of FIG. 10, with the glue tray inserted into the device.

With reference to FIGS. 1 and 2, a glue board 10 is shown. The glue board 10 in the illustrated embodiment has a peripheral border 12 and a central glue containing upper surface 14. A release paper or other protective material typically overlays the glue area 14 prior to use. Glue boards of this type are commercially available, with one example being a trapper LTD. EPA EST. NO. 12455-WI-1 glue board from Bell Laboratories, Inc., of Madison, Wis. The glue is tacky enough to trap pests such as insects as well as rodents and other animals that travel across the glue containing surface. FIGS. 10-12 illustrate exemplary embodiments shown with a glue tray instead of a glue board. Glue trays are also commercially available and are commonly used to trap pests including larger pests.

The exemplary apparatus comprises a housing 20 which, in the form shown is of a generally rectangular cross-section, having a width that is greater than the height. In one example, the housing is 4.5 inches wide (dimension A in FIGS. 3 and 6), 2.0 inches high (dimension B in FIGS. 4 and 6) and 12 inches long (dimension C in FIGS. 3 and 6). The housing 20 can comprise an interior enclosure which has at least one entrance opening, such as at one or more locations and desirably both ends thereof, through which pests can enter. In the embodiment of FIG. 1, the housing comprises a base portion 22, a top portion 24 and first and second side portions 26,28. The illustrated base portion is shown with a longitudinal center line 23. These portions can be panels or walls. First and second apertures 30,32 are provided adjacent to the respective ends of the housing 20, through top 24 thereof. As one example, apertures 30,32 can be 0.38 inch in diameter through top wall 24 at a location spaced 0.75 inch from each end of the housing and located along a line parallel to the center line 23 of the base portion (see FIG. 3). These openings are optional and can be otherwise sized, configured and positioned. These apertures can be engaged by a trap installation or removal device (such as a wire hook) for positioning and removal of the trap from hard to reach locations. The side portions, top portion and base portion can have wall thicknesses (see FIG. 5) of any desirable thickness T, with 0.125 inch being a specific example (excluding the thickness of sloping side wall portions). These thicknesses need not be uniform for each of these components.

A first elongated groove 50 is provided along one side of the housing 20 and a second elongated groove 52 is provided along the opposite side of the housing 20. These elongated grooves can extend the full length of the housing and are designed to receive respective side edge portions of the glue board 10. By extending grooves 50,52 the full length of the housing, the glue board can be inserted from either end of the housing. Alternatively, the grooves may extend only partially along the respective side walls with the end of the grooves in this case in effect providing a stop that limits the depth of insertion of the glue board into the housing. The illustrated grooves are bounded along their bottom portions by an upper interior surface of base 22. The grooves extend sideways into the respective walls 26,28.

In the embodiment of FIG. 1, interior wall surfaces 60,62 of the respective walls 26,28 are sloped inwardly moving from top to bottom of the walls. Thus, for example, the walls can converge moving from top, or from a location spaced from the top, in a direction toward the base 22. As a result, ants and other insects traveling along the walls tend to be funneled downwardly as they travel through the trap and toward the glue containing surface 14. Although this angle of inclination can vary, exemplary angles include from about two degrees to about eight degrees from vertical. FIG. 5 illustrates an exemplary eight degree angle (from vertical when base portion 22 is on the ground or horizontal) and FIG. 7 illustrates an exemplary two degree angle.

The trap housing can be of other configurations than the configuration shown in FIG. 1. For example, the walls 26,28 and top 24 can be replaced by a structure that is arching or semi-circular in cross-section and with a flat glue board supporting face. In an exemplary structure, the side portions are curved and merge into the top portion. In this case, the side portions of the structure can still slope inwardly. Desirably, upwardly facing horizontal pathways through the trap are eliminated in some embodiments other than horizontal surfaces containing pest entrapping glue. In a desirable form, the housing can have portions that at least overlie the entire glue board.

In one form, the depth of the grooves 50,52 into the side walls 26,28 can be greater than or at least sufficient to receive the entire unglued portion of the sides of the glue board so that, as for example as can be seen in FIG. 2, there is no horizontal surface through the housing along the base thereof which does not contain exposed glue 14. The height of the grooves can be greater than the thickness of the glue board or greater than the thickness of the glue supporting base of the glue board.

FIGS. 3, 4 and 5 depict exemplary dimensions for an embodiment in accordance with FIG. 1. These dimensions can be varied. Desirably, the width dimension is great enough to receive a commercially available glue board without the need for cutting or folding the glue board. In addition, desirably the height is low enough to minimize the possibility of birds, bats, and flying pests traveling through the trap without engaging the glue board. An exemplary desirable height B is two inches from the outer surface of base portion 22 to the outer surface of top portion 24.

An exemplary groove or slot 50,52 is approximately ³⁄₁₆" in width (W in FIGS. 5 and 6) and ⅛" in height (H in FIGS. 5 and 6) and can run the entire length of the housing or tube.

The housing 20 of FIG. 1 can be manufactured by any convenient process. Although the housing can be made of other materials such as wood or metal, or combinations thereof, an exemplary housing is a one piece unitary monolithic housing that is molded or extruded of a desirable polymer material, such as PVC. If extruded, for example using a metal die, individual traps can be cut to length by cutting off lengthwise extending sections of the extrusion.

In the embodiment of FIGS. 6, 7 and 8, features in this embodiment in common with the features of the FIG. 1 embodiment have been assigned the same number. In this example, although the sidewalls including the slopes formed therein can be of unitary one piece construction, dashed lines 70,72 are shown to indicate that slope forming wedge members 74,76 can be mounted to the respective side walls 26,28 to provide, in this example, desirable sloping surfaces at the interior surfaces 60,62 of the housing 20. FIGS. 5 and 8 illustrate exemplary radiuses of the corners of these embodiments, with a radiused corner of a 0.125 inch radius R, being one specific example.

Figure 9:
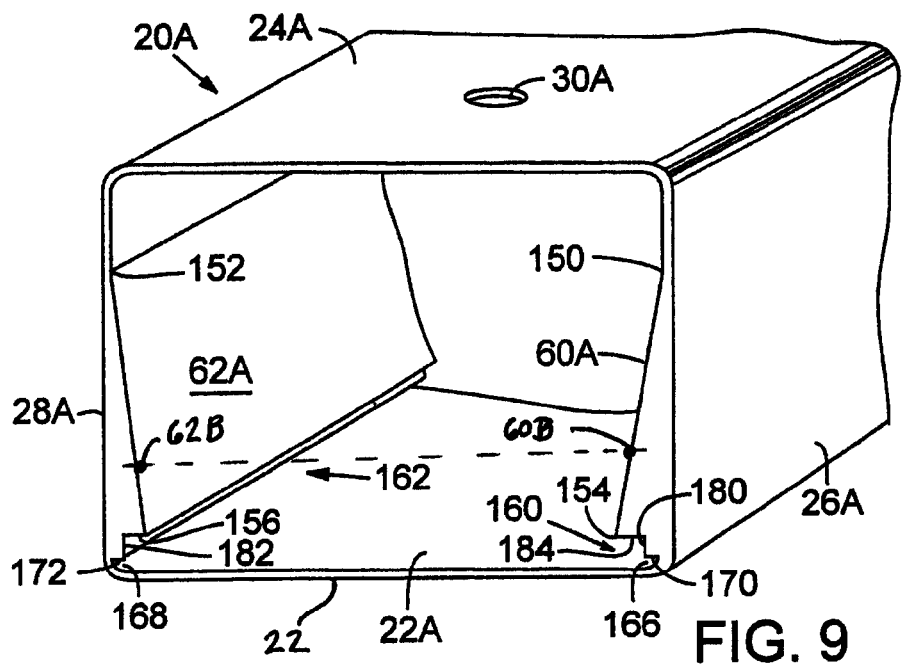
FIG. 9 is a perspective view of another embodiment of a pest trapping and monitoring device in accordance with the disclosure.

In the FIGS. 9 and 10 embodiment, components in common with the FIGS. 1 and 6 embodiments have been assigned the same number and letter "A" and will not be discussed in detail. Alternative features (e.g. housing configuration, slot length, and other features as described above) can also be used in the FIGS. 9 and 10 embodiments such as discussed in connection with the FIGS. 1 and 6 embodiments. However, in the FIGS. 9 and 10 embodiments, the housing dimensions are typically larger (e.g. height 4 inches from the bottom of the bottom surface to the top of the top surface; width 5 and ⁷⁄₁₆ inches from the exterior of one side surface to the exterior of the other side surface; length 12 inches (although the length can vary from the length of the FIGS. 1 and 6 embodiments). These dimensions can be varied. In the embodiments of FIGS. 9 and 10, the sloped sidewalls, 60A and 62A converge toward one another, from respective locations 150,152 to respective wall locations 154,156 of the side walls. The side walls can alternatively slope from the top of the interior sidewalls of the pest trap instead of at locations spaced from the top. Thus, for example, in FIG. 9 the sidewalls 60A, 62A converge at an incline moving from a respective first location 60B along sidewall 60A and a respective second location 62B along sidewall 62A toward the base 22. In this example, as can be seen in FIG. 9, the sloped portions of the sidewalls are non-vertical and the slope is gradual. Respective glue board receiving slots 160,162 are provided along the base 22A of the housing. Slots 160,162, for example, can extend along the entire length of the housing or only partially therealong. Slots 160, 162 desirably are configured to receive either a glue board or glue tray within the apparatus. The respective slots 160,162 can each have the same configuration and can, for example, be shaped as shown in FIG. 9. In this example, a lower slot portion 166 is bounded along a lower surface by a portion of the upper surface of base 22A, has a curved end portion bounded by an interior portion of wall 26A, and along an upper surface by an overhanging lip portion 170 of the wall 26A. A similar slot portion 168 is provided at wall 28A. The distance between the outer slot portions 166 and 168 is sufficient to receive a glue board 10 or side edges 12 of a glue board. For example, and although variable, the distance between the locations where the curved portion of each of the slots 166,168 start can be 4 and ³⁄₁₆ inches; the width between the slots 166 and 168 along respective surfaces 170, 172 can be, for example, 5 and ³⁄₁₆ inches; and the inward edges of surfaces 170, 172 can be 4 and ¹³⁄₁₆ inches apart. The slot 160 has an upwardly extending wall portion 180 that steps upwardly from the inner edge of slot surface 170 to an upper overhanging undercut ledge surface 184. A similar step 182, and undercut ledge 186, is provided at wall 28A. The distance between walls 180 and 182 is sufficient to accommodate a glue tray positioned there between. The height between the upper surface of base 22A and the surfaces 184,186 is sufficient to accommodate the height of a glue tray. Thus, the FIGS. 9 and 10 embodiment illustrates an exemplary housing having side slots 160,162 configured to accommodate the use of either a glue board or glue tray as desired by the user of the device. In this example, the lateral spacing between portions of the slots that receive a glue tray is less than the lateral spacing between portions of the slots that receive a glue board.

In the FIGS. 11 and 12 embodiment, components in common with components of the FIGS. 1 and 6 embodiment have been assigned the same number with the added letter "B" and will not be discussed in detail. Alternative features, (e.g. housing configuration, slot length, and other features) can be used in the FIGS. 11 and 12 embodiments, such as discussed in connection with the FIGS. 1 and 6 embodiments. However, although variable, in the FIGS. 11 and 12 embodiment, the housing dimensions are typically somewhat larger than in the FIGS. 1 and 6 embodiment. The embodiment of FIGS. 11 and 12 can be provided with a single opposed pair of slots, such as slots 50B,52B along the sides of the housing and abutting the base portion, for example. Alternatively, a set of upper slots 100B,102B spaced from base 22B can be provided to receive side edges (e.g. 108B,110B) of a pest trapping tray 104B having an adhesive substance 106B positioned in the interior of the tray. The illustrated tray 104B also has front and rear edges 112B,114B. In addition, the tray has a height H, indicated from the top of surface 112B to the undersurface of the bottom of the tray. Desirably, the height of slots 100B,102B above base 22B is greater than or equal to H, the height of the tray, so that the slots 100B,102B are in a position to slidably receive the side edges 108B and 110B of the tray. In an exemplary configuration, the height H of the slots 100B,102B is designed so that the bottom of the tray rests on and is supported by the upper surface of base 22B with the side edges 108B,110B of the tray positioned in the respective slots 100B,102B. Desirably the depth of the slots 100B,102B is greater than or equal to the width of the side edge 108B,110B so that a path through the housing is not provided along exposed non-glue containing portions of the side edges 108B, 110B. However, the depth of the slots 100B,102B can be varied. Also, although not required, the walls 60B and 62B slope inwardly, and thus converge moving from a top portion of, or from the top of, each side wall toward the base so as to assist in funneling or directing insects crawling on the sloped walls toward the adhesive surface 106B. In the embodiment of FIGS. 11 and 12, a set of two slots is provided along each side wall (e.g. slots 50B,100B along the interior of side wall 26B and slots 52B and 102B along the interior of wall 28A). Alternatively, only the slots 100B,102B can be provided, or, like the embodiment of FIG. 1, only the slots 50B and 52B can be provided. With a set of two slots being provided along each side wall, the housing readily accommodates both flat glue boards and glue trays for multiple pest trapping applications.

Having illustrated and described the principles of my invention with reference to exemplary embodiments, it should be apparent to those of ordinary skill in the art that these embodiments may be modified in arrangement and detail without departing from the inventive principles disclosed herein. All such variations are within the scope of my invention.

I claim:

1. A pest trap for receiving a pest entrapping glue board or glue tray, the pest trap comprising:
    an elongated housing having a length and defining a interior, the housing comprising a base portion, a top portion, and first and second upwardly extending side portions, and at least one pest entrance opening, communicating with the interior of the housing; and
    the first side portion comprising a first interior wall portion and the second side portion comprising a second interior wall portion, the first interior wall portion comprising a first sloped portion that is non-vertical when the base portion is horizontally oriented and converging toward the second interior wall portion in a direction from a first location spaced from the base portion toward the base portion, and the second interior wall portion comprising a second sloped portion that is non-vertical when the base portion is horizontally oriented and converging toward the first interior wall portion in a direction from a second location spaced from the base portion toward the base portion; wherein the first side wall portion comprises a first glue board or glue tray edge receiving slot recessed into the first interior wall portion and adjacent to the base portion and extending in a lengthwise direction at least partially along the length of the housing and wherein the second side wall portion comprises a second glue board or glue tray edge receiving slot recessed into the second interior wall portion and adjacent to the base portion and extending in a lengthwise direction at least partially along the length of the housing.

2. A pest trap according to claim 1 wherein the housing is generally rectangular in cross section.

3. A pest trap according to claim 1 wherein the first and second sloped portions each converge toward one another at an angle of from about two degrees to about eight degrees from vertical when the base portion is positioned horizontally.

4. A pest trap according to claim 1 wherein the first location is spaced from the top of the first side wall portion and the second location is spaced from the top of the second side wall portion.

5. A pest trap according to claim 1 wherein the first location is at the top of the first side wall portion and the second location is at the top of the second side wall portion.

6. A pest trap according to claim 1 wherein the first and second slots extend along the entire length of the housing.

7. A pest trap according to claim 1 wherein a lower portion of each of the first and second slots is bounded by a surface of the base portion.

8. A pest trap according to claim 1 wherein the first and second slots are spaced from the base portion.

9. A pest trap according to claim 1 wherein the first sloped portion slopes downwardly and inwardly at an incline when the base portion is oriented horizontally, and the second sloped portion slopes downwardly and inwardly at an incline when the base portion is oriented horizontally.

10. A pest trap according to claim 1 wherein the housing has a length and wherein the first sloped portion extends along the entire length of the housing and wherein the second sloped portion extends along the entire length of the housing.

11. A pest trap according to claim 1 wherein at least a portion of the first sloped portion is positioned above the first slot and wherein at least a portion of the second sloped portion is positioned above the second slot.

12. A pest trap according to claim 1 wherein said at least a portion of the first sloped portion abuts a boundary of the first slot and wherein said at least a portion of the second sloped portion abuts a boundary of the second slot.

13. A pest trap according to claim 1 wherein the first and second slots comprise a lower glue board receiving slot portion and an upper glue tray receiving slot portion.

14. A pest trap according to claim 13 wherein the first and second wall portions each comprise an elongated step at a transition between the glue board receiving slot portion and the glue tray receiving slot portion.

15. A pest trap according to claim 13 wherein the lateral spacing between the glue board receiving portions of the first and second slots is greater than the lateral spacing between the glue tray receiving portions of the first and second slots.

16. A pest trap for receiving a pest entrapping glue board or glue tray, the pest trap comprising:
    an elongated housing defining an interior, the housing comprising a base portion for supporting the glue board or glue tray, the housing also comprising first and second side portions and first and second end portions, the housing also defining at least one door-free entrance opening at one of the first and second end portions through which pests can enter into the interior of the housing so as to become entrapped when the pests contact the glue board;
    the first side portion comprising a first gradually sloping interior wall section, the second side portion comprising a second gradually sloping interior wall section, the first sloping interior wall section comprising at least a first portion that slopes downwardly and inwardly when the base portion is oriented horizontally, the second sloping interior wall section comprising at least a second portion that slopes downwardly and inwardly when the base portion is oriented horizontally;
    wherein the housing has a length and wherein the first portion of the first sloping interior wall section extends along the entire length of the housing and wherein the second portion of the second sloping interior wall section extends along the entire length of the housing;
    the first side portion comprising a first elongated slot recessed into the first sloping interior wall section and the second side portion comprising a second elongated slot recessed into the second sloping interior wall section, the first and second slots being laterally spaced apart and also being positioned, sized and oriented to receive respective edge portions of the glue based board or glue tray;

wherein the first and second slots extend lengthwise along the entire length of the housing;

wherein at least a portion of the first portion of the first sloping interior wall section is positioned above the first slot and wherein at least a portion of the second portion of the second sloping interior wall section is positioned above the second slot;

wherein said at least a portion of the first portion of the first sloping interior wall section abuts a boundary of the first slot and wherein said at least a portion of the second portion of the second interior wall section abuts a boundary of the second slot; and wherein the first and second slots and first and second interior wall sections are configured so as to not provide a horizontal surface through the housing when the base portion is horizontal.

17. A pest trap according to claim 16 wherein the first and second slots comprise a glue tray receiving portion spaced from the base portion for receiving side edge portions of a glue tray.

18. A pest trap according to claim 17 wherein the first and second slots comprise a glue board receiving portion abutting the base portion.

19. A pest trap according to claim 16 wherein a lower portion of each of the first and second slots is bounded by a surface of the base portion.

20. A pest trap according to claim 19 that has no end wall or door at either of the first and second end portions.

21. A pest trap according to claim 16 which has no end wall or door at either of the first and second end portions.

* * * * *